US012292672B2

(12) United States Patent
Saito (10) Patent No.: US 12,292,672 B2
(45) Date of Patent: May 6, 2025

(54) SUPPORTING APPARATUS FOR IMAGING DEVICE, AND IMAGING APPARATUS (71) Applicant: NIFCO INC., Yokosuka (JP)

(72) Inventor: Takahiro Saito, Yokosuka (JP)

(73) Assignee: NIFCO INC., Yokosuka (JP)

( * ) Notice: Subject to any disclaimer, the term of this patent is extended or adjusted under 35 U.S.C. 154(b) by 66 days.

(21) Appl. No.: 18/021,069

(22) PCT Filed: Sep. 9, 2021

(86) PCT No.: PCT/JP2021/033146
§ 371 (c)(1),
(2) Date: Feb. 13, 2023

(87) PCT Pub. No.: WO2022/065051
PCT Pub. Date: Mar. 31, 2022

(65) Prior Publication Data
US 2023/0296967 A1    Sep. 21, 2023

(30) Foreign Application Priority Data
Sep. 23, 2020   (JP) ................................ 2020-158808

(51) Int. Cl.
*B60R 11/04*  (2006.01)
*G03B 17/55* (2021.01)
*G03B 17/56* (2021.01)

(52) U.S. Cl.
CPC .............. *G03B 17/55* (2013.01); *B60R 11/04* (2013.01); *G03B 17/561* (2013.01)

(58) Field of Classification Search
CPC .................................. B60R 11/04; H05B 3/06
See application file for complete search history.

(56) References Cited

U.S. PATENT DOCUMENTS

| 4,034,207 A * | 7/1977 | Tamada ................... H05B 3/10 337/159 |
| 9,854,225 B2 * | 12/2017 | Kimura .................... B60R 11/04 |
| 2017/0205625 A1 * | 7/2017 | Wehninck ............ G03B 11/045 |
| 2017/0295610 A1 | 10/2017 | Usami et al. |
| 2020/0191620 A1 * | 6/2020 | Kasai ....................... B60R 11/04 |
| 2020/0275533 A1 | 8/2020 | Ochiai |

FOREIGN PATENT DOCUMENTS

| CN | 110703535 A | * | 1/2020 | ............. G03B 11/04 |
| JP | 2003-343867 A | | 12/2003 | |
| JP | 2016-034791 A | | 3/2016 | |
| JP | 2017-185896 A | | 10/2017 | |
| JP | 2019-093794 A | | 6/2019 | |

OTHER PUBLICATIONS

Machine translation of JP2016-034791 A (Year: 2024).*
PCT/ISA/210, "International Search Report for PCT International Application No. PCT/JP2021/033146," Nov. 2, 2021.
Extended European Search Report of European Application No. 21872182.7 dated Oct. 4, 2024, 9 pp.

* cited by examiner

Primary Examiner — Leon W Rhodes, Jr.
(74) Attorney, Agent, or Firm — HAUPTMAN HAM, LLP

(57) ABSTRACT

A supporting apparatus for an imaging device, for supporting the imaging device includes a heating device having a heat generating portion, and a supporting portion for supporting the heating device, wherein the heating device is provided on a surface of a heating subject side in the supporting portion, and the surface of the supporting portion includes one or a plurality of non-contact portions which do not contact the heat generating portion.

15 Claims, 5 Drawing Sheets

SUPPORTING APPARATUS FOR IMAGING DEVICE, AND IMAGING APPARATUS

RELATED APPLICATIONS

The present application is National Phase of International Application No. PCT/JP2021/033146 filed Sep. 9, 2021, and claims priority from Japanese Application No. 2020-158808, filed Sep. 23, 2020, the disclosure of which is hereby incorporated by reference herein in its entirety.

FIELD OF THE INVENTION

The present invention relates to a supporting apparatus for imaging device for taking an image outside a vehicle through, for example a window glass of a vehicle, and an imaging apparatus.

BACKGROUND TECHNOLOGY

The imaging device for a vehicle is provided, for example, inside a vehicle compartment near a wind shield glass provided in front of a vehicle body, and detects presence or absence of another vehicle and an obstacle in front of the vehicle. For example, an imaging device disclosed in Patent Document 1 includes a bracket, a camera unit, and a light shielding heating unit. The light shielding heating unit has an object to take a clear image by the camera unit, and has a function for dissipating water drops, frost and ice due to moisture condensation attached to the wind shield glass (front window) near the camera unit. The light shielding heating unit includes a light shielding hood, a heater module, and a heat shielding material. The heater module is attached to a surface opposite to the camera unit by a double-sided tape. Also, the heat shielding material is attached to a surface opposite to the light shielding hood in two faces of the heater module through a fuse module. The heat shielding material suppresses heat generated at the heater module from escaping to outside from, such as a lower face of the heat insulating material.

PRIOR ART LITERATURE

Patent Literature

Japanese Patent Publication No. 2017-185896

SUMMARY OF THE INVENTION

Problems to Solve by the Invention

However, in the imaging device as explained above, there is a situation such that the water drops and so on attached to the window shield glass cannot be sufficiently dissipated. Therefore, improving the heating effect is demanded.

Means for Solving the Problems

In one aspect of the present disclosure, a supporting apparatus for an imaging device is a supporting apparatus for the imaging device, for supporting the imaging device, comprises a heating device having a heat generating portion, and a supporting portion for supporting the heating device, wherein the heating device is provided on a surface of a heating subject side in the supporting portion, and the surface of the supporting portion includes one or a plurality of non-contact portions which do not contact the heat generating portion.

In one aspect of the present disclosure, an imaging apparatus comprises an imaging apparatus, and a supporting apparatus for an imaging device, for supporting the imaging device, wherein the supporting apparatus for the imaging device includes a heating device having a heat generating portion, and a supporting portion for supporting the heating device, the heating device is provided on a surface of a heating subject side in the supporting portion, and the surface of the supporting portion includes one or a plurality of non-contact portions which do not contact the heat generating portion.

EMBODIMENTS OF THE INVENTION

First Embodiment

Hereinbelow, a first embodiment embodying a supporting apparatus for the imaging device is explained.

Figure 1:
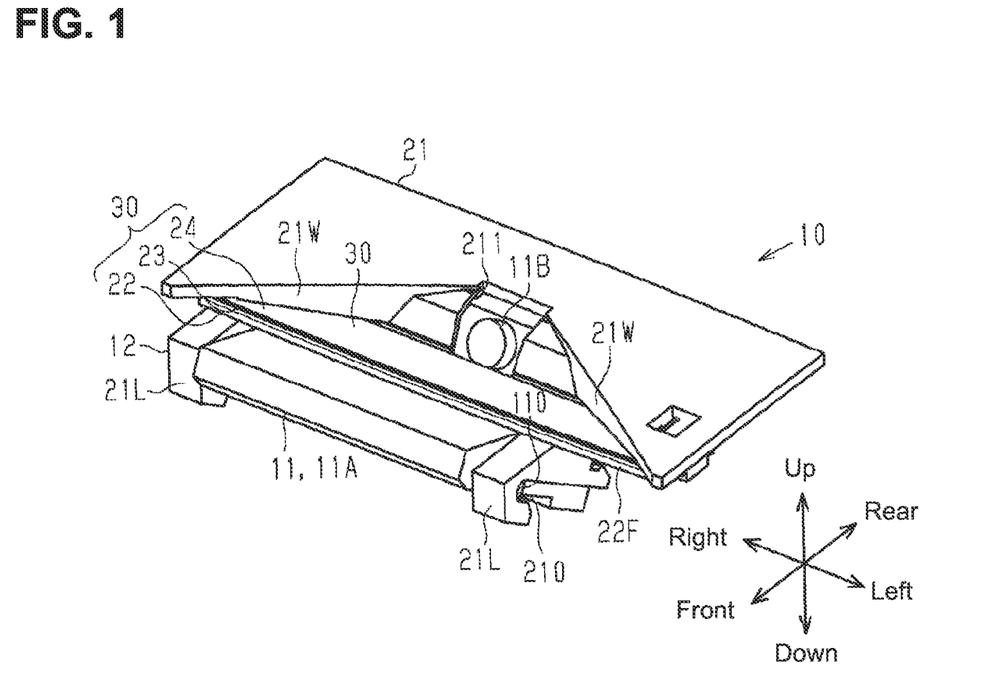
FIG. 1 is a perspective view showing an entire structure of an imaging apparatus and a supporting apparatus for an imaging device according to a first embodiment of the invention.

With reference to FIG. 1, an entire structure of an imaging apparatus 10 equipped with the supporting apparatus for the imaging device is explained. The imaging apparatus 10 includes an imaging unit 11, and a supporting device 12 for the imaging apparatus. Incidentally, the supporting apparatus for the imaging device is simply referred to as the supporting device 12. Also, the imaging unit 11 corresponds to the imaging apparatus.

The imaging unit 11 includes a main body 11A, and a lens 11B. The main body 11A includes, for example, an imaging element, a recording element, a housing for housing these elements, and so on. The lens 11B exposes through a notch 211 of the supporting device 12, and faces a windshield glass.

The supporting device 12 includes a bracket 21, a lens hood 22, a heating device 23 and a reflection suppressing sheet 24. The bracket 21 supports the imaging unit 11. The bracket 21 includes a pair of engaging legs 21L. Each of grooves 210 of the engaging legs 21L engages each of projecting portions 110 of the imaging unit 11, so that the bracket 21 supports the imaging unit 11. Incidentally, the projecting portions 110 provided in the imaging unit 11 are not a pair, but plural projections, however, the number thereof is not especially limited. The lens hood 22 corresponds to a supporting portion supporting the heating device 23 from behind thereof. The bracket 21 and the lens hood 22 are formed mainly of resin. The resin may be one kind or plural kinds. Also, the bracket 21 and the lens hood 22 may be a combination of resin and a material other than resin.

The bracket 21 includes a notch 211 for exposing the lens 11B, and light shielding walls 21W provided on both sides of the notch 211. The light shielding walls 21W widen from a base portion at a notch 211 side to a front end at the opposite side so that a relative distance with respect to the light shielding walls on the other side increases. Accordingly, the light shielding walls 21W keep a field of view of the imaging unit 11, but shield a part of light incident to the bracket 21. Accordingly, incident of light which provides bad influence for taking an image, such as flare and so on, occurred by a reflection of light from the windshield glass and an excess light is suppressed.

Also, the heating device 23 is arranged between the light shielding walls 21W. The light shielding walls 21W also have a function of reflecting radiant heat from the heating device 23. The light shielding walls 21W heat the windshield glass by a secondary radiation reflecting the radiant heat not incident to the windshield glass to the windshield glass.

The bracket 21 supports the lens hood 22. the heating device 23 and a reflection suppressing sheet 24. The lens hood 22, the heating device 23 and the reflection suppressing sheet 24 are attachably and detachably attached to the bracket 21. The lens hood 22, the heating device and the reflection suppressing sheet 24 form an attachment-detachment unit 30. Thus, by removing the attachment-detachment unit 30 from the bracket 21, maintenance of the heating device 23 and so on can be made.

Figure 2:
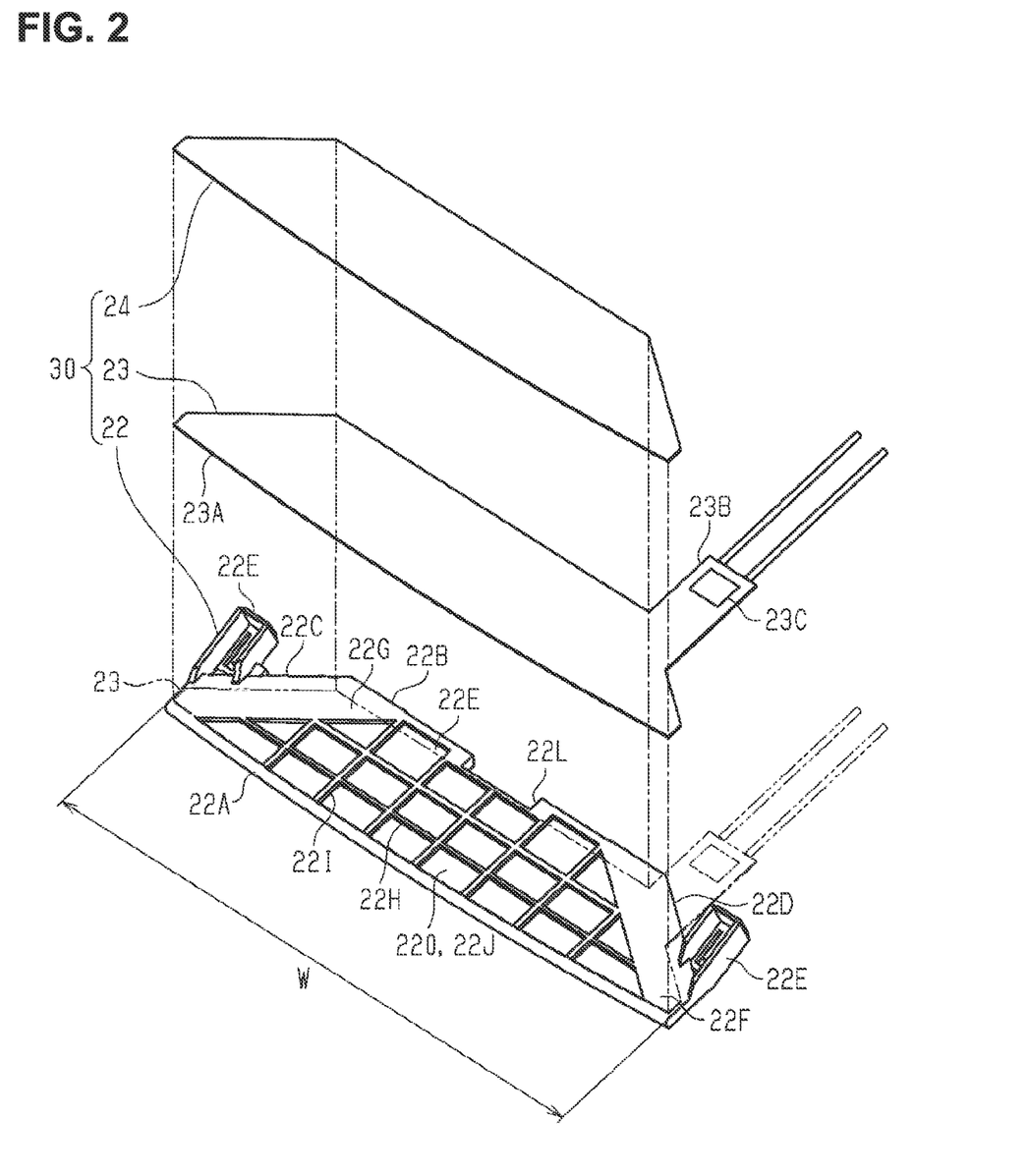
FIG. 2 is a perspective view of an attachment and detachment unit for the supporting apparatus for the imaging device of the first embodiment.

Next, with reference to FIG. 2, the attachment-detachment unit 30 is explained. In FIG. 2, as shown by two dots chain lines and solid lines, the heating device 23 is provided on a front surface of the lens hood 22, and the reflection suppressing sheet 24 is provided on the front surface of the heating device 23. The heating device 23 is joined to the lens hood 22 by an adhesive material and so on. Also, the reflection suppressing sheet 24 is joined to the heating device 23 by an adhesive material and so on.

The lens hood 22 supports the heating device 23. The lens hood 22 includes a notch 22L on a rear surface 22B for housing the lens 11B. The notch 22L continues to the notch 211 of the bracket 21 when the attachment-detachment unit 30 is supported by the bracket 21. A front surface 22F of the lens hood 22 has approximately a trapezoid shape wherein the width W thereof becomes gradually greater from the rear surface 22B to the front surface 22A. The lens hood 22 is formed, as explained above by one or plurality of resins, but the kind thereof is not limited as long as the resin has strength enough to support the heating device 23. The lens hood 22 may be formed of, for example a foam plastic.

Also, side faces 22C, 22D of the lens hood 22 are, respectively, provided with engagement projections 22E. By engaging the engagement projections 22E with main body grooves, not shown, of the bracket 21, the lens hood 22 is supported by the bracket 21.

Side end portions 22G are provided at both sides in the width direction of the lens hood 22. Also, the lens hood 22 has a plurality non-contact portions 220 on the front surface 22F. Each of the non-contact portions is defined by side edge portions 22G, first projections 22H projecting in the width direction, second projections 22I projecting perpendicular to the width direction and crossing the first projections 22H. The non-contact portions 220 are spaces defined by the side end portions 22G, the first projections 22H and the second projections 22I. The side end portions 22G, the first projections 22H and the second projections 22I are located on the same plane or substantially on the same plane, and the non-contact portions 220 are formed in a concave shape in the plane. The heights of the first projections 22H and the second projections 22I are constant (refer to FIG. 4). Here, the height H is a height from a bottom face 22J defining the non-contact portion 220. The plural non-contact portions 220 are arranged in a lattice shape in an area sandwiched by the side end portions 22G.

The heating device 23 includes a heat generating portion 23A and a driving portion 23B. The heat generating portion 23A may be a heater in a flat shape, and a kind thereof is not especially limited. For example, the heat generating portion 23A includes a plane shape good conducting member, a current-carrying portion, and a pair of insulating films. The current-carrying portion is formed of one heating wire, and is connected to the driving portion 23B. The current-currying portion sandwiched between the pair of insulating films. The plan shape good conducting member is fixed on one of the insulating films. The driving portion 23B is electrically connected to the heat generating portion 23A, and provides current to the heat generating portion 23A. The driving portion 23B includes a protection circuit 23C. The protection circuit 23C includes a temperature fuse, and suppresses a magnitude of the current flowing through the plate shape heating member within a predetermined range.

An adhesive material, not show, is provided on front surfaces of the side edge portions 22G of the lens hood 22, and front surfaces of the first projections 22H and the second projections 21. The heat generating portion 23A of the heating device 23 is connected to the side edge portions 22G, the first projections 22H and the second projections 22I through the adhesive material, and does not contact the non-contact portions 220. Also, since the heights of the first projections 22H and the second projections 22I are constant, a space with a constant height is formed between the heating device 23 and the bottom face 22J defining the non-contact portions 220.

The reflection suppressing sheet 24 is fixed to the heat generating portion 23A through an adhesive material or an adhesive layer. The reflection suppressing sheet 24 has a size covering substantially an entire area of the heat generating portion 23A. The reflection suppression sheet 24 is, for example a resin film, and suppresses reflection of light by absorbing light incident to the reflection suppressing sheet 24. The reflection suppressing sheet 24 may have projections and dents on a surface thereof to suppress reflection of light.

Figure 3:
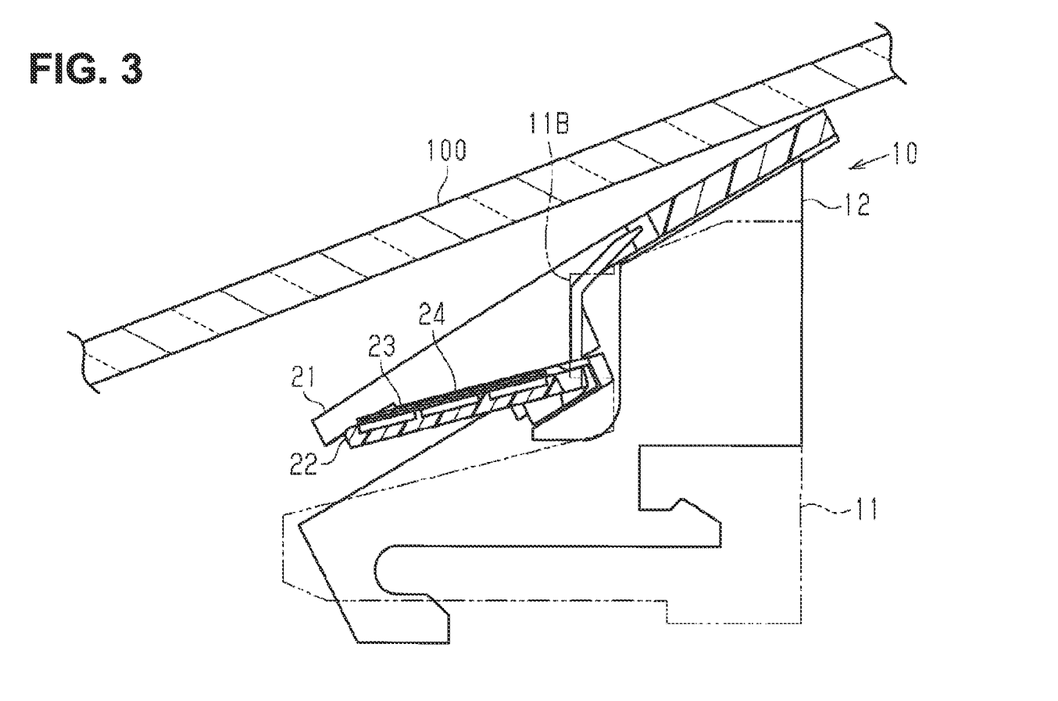
FIG. 3 is a sectional view of the supporting apparatus for the imaging device of the first embodiment.
Figure 4:
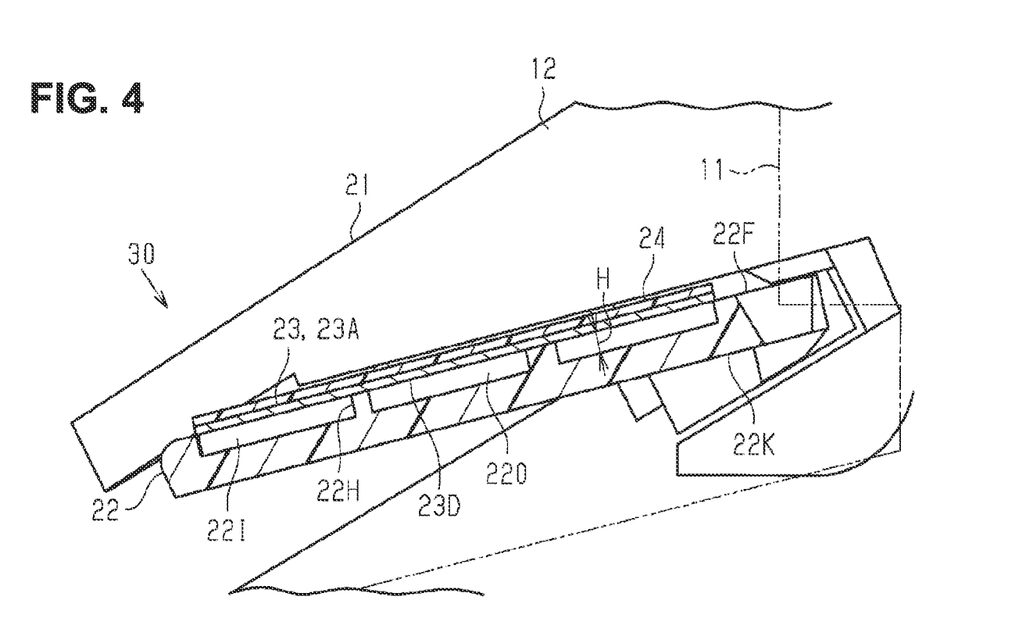
FIG. 4 is a drawing showing an important part of the sectional structure for the supporting apparatus for the imaging device of the first embodiment.

With reference to FIG. 3 and FIG. 4, an operation of the imaging apparatus 10 is explained. As shown in FIG. 3, the imaging apparatus 10 is attached in a posture such that the lens 11B is directed to the windshield glass 100. An attached portion to which the imaging apparatus 10 is attached, is not especially limited, but may be one of, for example, a windshield glass, a roof, and an instrument panel. The imaging apparatus 10 may be a device taking an image in a rear direction or side directions of a vehicle in addition to the front direction of the vehicle. Namely, the imaging apparatus 10 may be provided such that the lens 11B is directed to a rear glass provided at a rear portion of the vehicle, and a side glass provided on a door at a side portion on the vehicle, other than the windshield glass 100.

As shown in FIG. 4, the heat generating portion 23A of the heating device 23 transfers radiant heat to the windshield glass 100 through the reflection suppressing sheet 24. In case the heat generating portion 23A is attached to the rear face 22K side of the lens hood 22, heat from the heat generating portion 23A is transferred to the windshield glass 100 as the radiant heat after the heat is transferred to the lens hood 22. For this reason, in this case loss of heat by the heat transfer at the lens hood 22 is great, but by forming the heat generating portion 23A on the front surface 22F, heat is not required to transfer through the lens hood 22, so that loss of heat by the heat transfer is small. Also, in case the heating device 23 is provided on the front surface 22F of the lens hood 22, as compared with the case where the heating device 23 is provided on the rear surface 22K of the lens hood 22, a distance relative to the windshield 100 becomes shoot. Accordingly. The heating device 23 can transfer the radiant heat to the windshield glass 100 directly and efficiently.

On the other hand, since the rear surface 23D of the heat generating portion 23A contacts the lens hood 22, heat is transferred to the lens hood 22 mainly by heat transfer. Thus, a part of heat of the heat generating portion 23A is lost by being transferred to the lens hood 22 from the rear surface 23D without radiation to the windshield glass 100, but a contact area is reduced by forming the non-contact area 220 on the lens hood 22, so that the heat moves through the side end portions 22G, the first projections 22H and the second projections 22I, which contact the heat generating portion 23A, not through air in the non-contact portion 220 which has low heat transfer rate. Accordingly, heat transferred from the heat generating portion 23A to the lens hood 22 is small as compared with the case without the non-contact portion. In other words, since the heat loss from the rear surface 23D of the heat generating portion 23A is small, a heating efficiency is increased, and a heat increasing speed at the time of start of the heating device 23 becomes high. Also, during heating, a maximum temperature that the heat generating portion 23A reaches becomes high.

Further, in addition to the side end portions 22G, the entire rear surface 23D of the heat generating portion 23A can be supported by the first projections 22H and the second projections 22I, so that even if vibration and impact of the vehicle are transferred, it is possible to withstand the load thereof. Also, even if the heat generating portion 23A is made of a flexible material or structure, by supporting the first projections 22H and the second projections 22I, it is possible to suppress deflection by its own weight. Since the first projections 22H and the second projections 22I have some height, it is possible to form the non-contact portions 220 with certain height between the heat generating portion 23A and the bottom defining the non-contact portion 220. Therefore, there will have no bias for the heat shielding effect of the lens hood 22 relative to the heat generating portion 23A, so that unevenness of heat at the heat generating portion 23A can be suppressed. Accordingly, the heating range for the windshield glass 100 can be heated without biasing.

As explained above, according to the first embodiment, the following effects are obtained.

(1) The supporting device 12 is provided with the heating device 23 on the front surface at the windshield glass 100 side in the lens hood 22. In this structure, since the distance between the heat generating portion 23A of the heating device 23 and the windshield glass 100 becomes small, the heating device 23 can directly and efficiently transfer the radiant heat to the windshield glass 100. Also, since the front surface 22F of the lens hood 22 is provided with the non-contact portion 220, the contact area between the lens hood 22 and the heat generating portion 23A is reduced. Accordingly, heat dissipating from the rear surface 23D of the heat generating portion 23A becomes small, so that the heating efficiency is further improved.

(2) The lens hood 22 incudes the side end portions 22G contacting the heat generating portion 23A, the first projections 22H and the second projections 22I, and the non-contacting portions 220 are defined by the side end portions 22G, the first projections 22H and the second projections 22I. Since the side end portions 22G, the first projections 22H and the second projections support the heat generating portion 23A, the heat generating portion 23A can be stably supported.

(3) Since the heights H of the side edge portions 22G, the first projections 22H and the second projections 22I are constant, it is possible to form the non-contact portions 220 having a constant height between the heat generating portion 23A and the bottom surface defining the non-contact portion 220. Therefore, unevenness of temperature of the heat generating portion 23A can be suppressed.

Second Embodiment

Next, a second embodiment of the supporting apparatus for the imaging device and the imaging apparatus is explained. Incidentally, in the second embodiment, the structure of the lens hood is different from that of the first embodiment. Hereinafter, the structures as in the first embodiment are assigned with the same numerals, and the explanations thereof are omitted.

Figure 5:
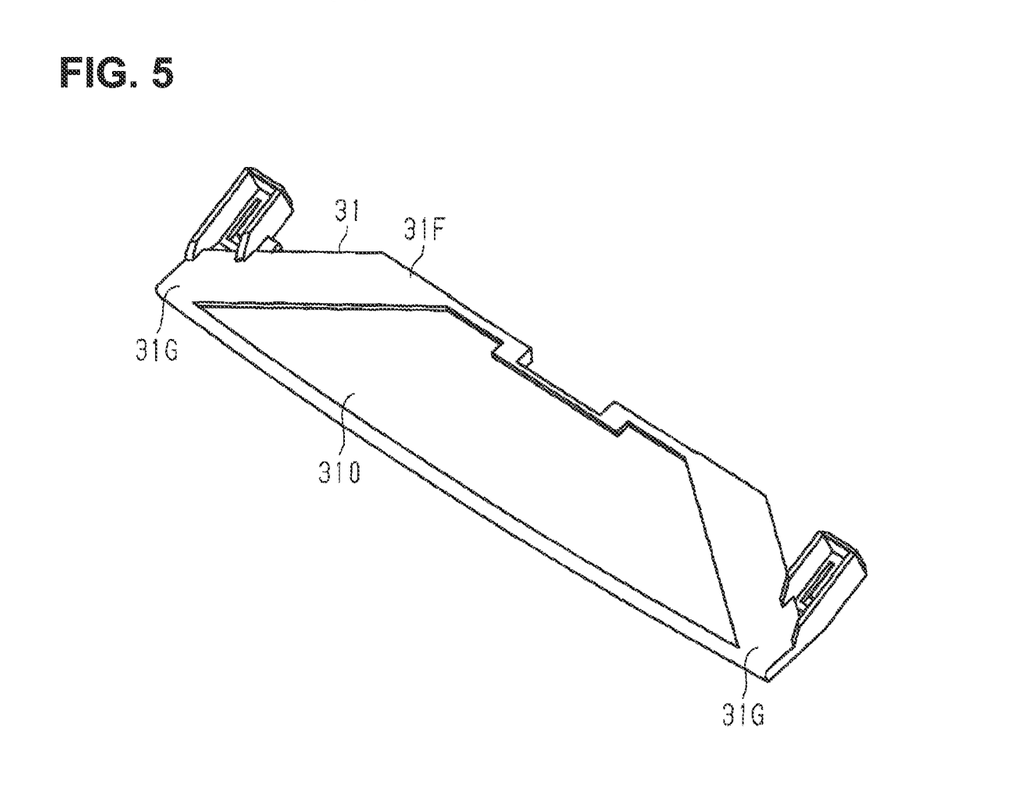
FIG. 5 is a perspective view of a lens hood of the imaging apparatus and the supporting apparatus for the imaging device according to a second embodiment of the invention.

As shown in FIG. 5, the lend hood 31 includes a pair of side edge portions 31G on the surface 31F thereof. One non-contact portion 310 is provided between the pair of side edge portions 31G. Namely, while the non-contact portions 220 of the first embodiment are defined plurally by the first projections 22H and the second projections 22I, the second embodiment is different in that the first projections 22H and the second projections 22I are not formed.

Figure 6:
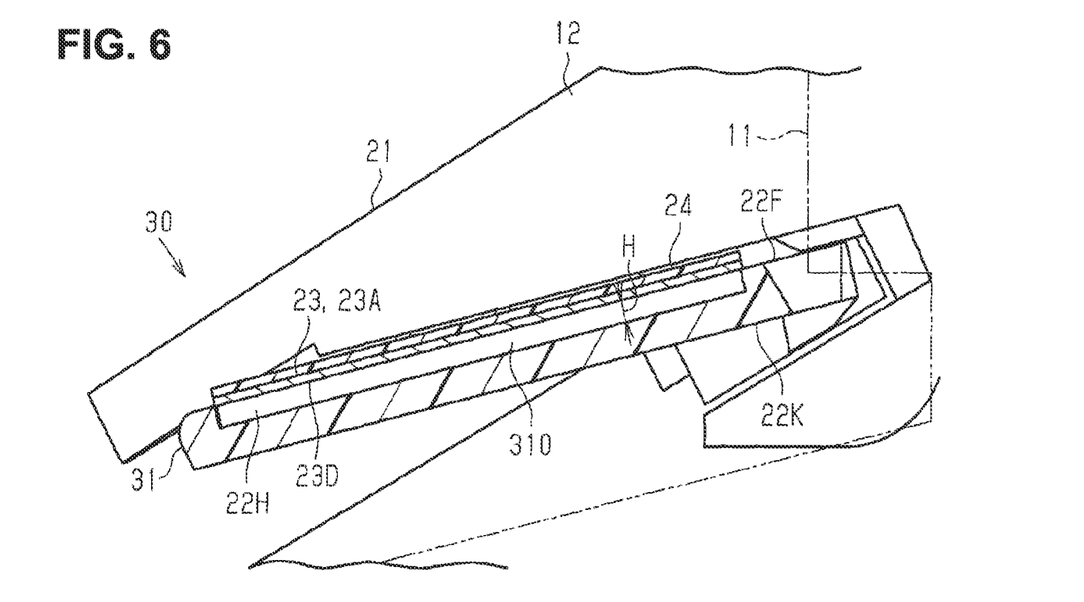
FIG. 6 is a sectional view of the supporting apparatus for the imaging device of the second embodiment.

As shown in FIG. 6, the lens hood 31 is provided with the non-contact portion 310, so that a non-contact area between the heat generating portion 23A and the lens hood 31 is minimized. As a result, heat of the heat generating portion 23A is transferred through the side edge portions 31G contacting with the heat generating portion 23A. Accordingly, the heat transferred from the heat generating portion 23A to the lens hood 31 is small comparing with a case where the non-contact portion 310 is not formed, so that the heating effect can be improved.

Also, the non-contact portion 310 of the present embodiment is great in its occupying capacity as compared with the non-contact portions 220 of the first embodiment, so that the heat shielding effect by heat transferred from the heat generating portion 23A is increased. Also, in the non-contact portion 310, as compared with the non-contact portion 220 of the first embodiment, bias of heat inside the non-contact portion 310 is suppressed, so that it is expected to increase the effect of suppressing the heat unevenness in the heat generating portion 23A.

As explained above, the second embodiment can obtain the following effect in addition to the effect (1) of the first embodiment.

(4) In the second embodiment, the lens hood 31 is provided with one non-contact portion 310. Accordingly, as compared with the case where plural non-contact portions are provided, a volume of the non-contact portion becomes large. Thus, it is possible to increase the heat shielding effect of heat transferred from the heat generating portion 23A is increased.

Other Embodiments

The above embodiments can be embodied with the following changes. The present embodiments and the following modified embodiments can be combined in a range without technical inconsistency.

Figure 7:
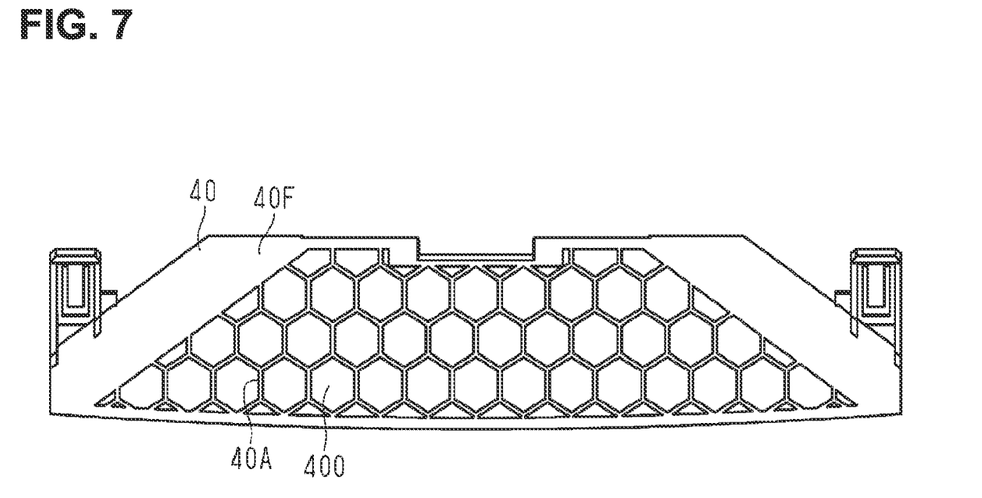
FIG. 7 is a perspective view showing the lens hood for the imaging apparatus and the supporting apparatus for the imaging device of a modified embodiment.
Figure 8:
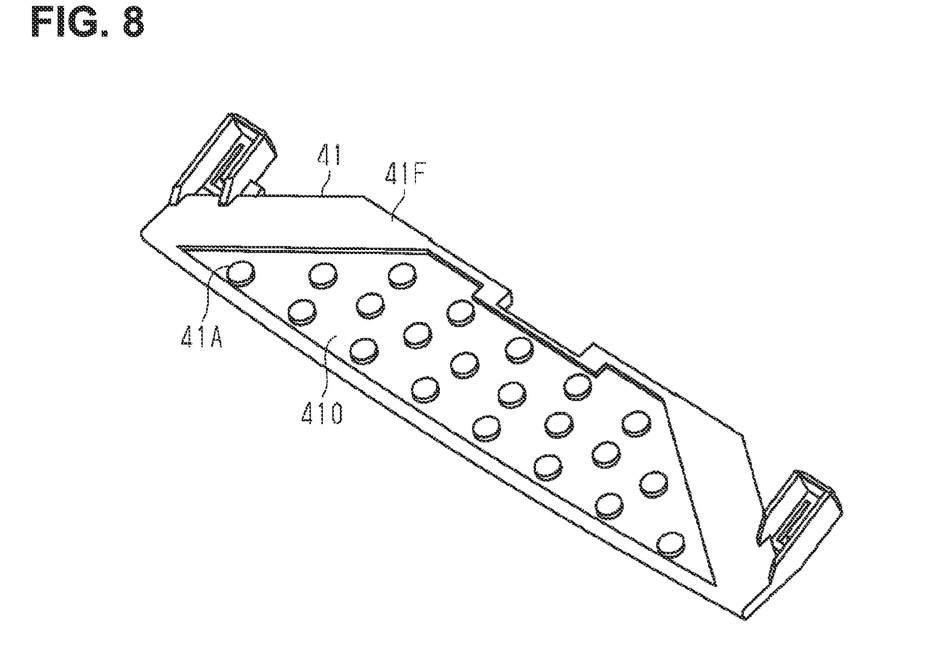
FIG. 8 is a plan view of the lens hood for the imaging apparatus and the supporting apparatus for the imaging device of the modified embodiment.

In the first embodiment, the plural non-contact portions 220 are formed by forming the first projections 22H and the second projection on the lens hood 22. In the second embodiment, one non-contact portion 310 is formed, but the number of the non-contact portion is not especially limited. Also, the shape of the projection defining the non-contact portion is not especially limited. For example, as shown in FIG. 7, a surface 40F of the lens hood 40 may have a honeycomb structure, and non-contact portions 400 may be formed by the wall portion 40A. The non-contact portion may not have a hexagonal shape in a view from the front side, and may be a circular shape or a triangular shape. Also, in one non-contact portion, a projection different from a projection supporting the heat generating portion 23A from the rear surface 23D may be formed. For example, as shown in FIG. 8, one non-contact portion 410 may be formed on a front surface 41F of a lens hood 41, and plural columnar projections 41A may be formed on the non-contact portion 410. The shape of the projection 41A is not especially limited, and may be a rectangular column.

In the first embodiment, the lens hood 22 includes the first projections and the second projections with the constant height. Instead of or in addition to this structure, the lens hood 22 may have a projection with different height or a projecting portion other than the projection. For example, the lens hood 22 is provided with the projection with different height, so that the surface 22F may have an inclined surface. Also, in the lens hood 22, a projection may be high in a portion where the temperature is likely to increase, to thereby increase a volume of the non-contact portion.

In the first embodiment, the lens hood 22 includes plural first projections 22H and second projections 22I. Instead of this structure, the lens hood 22 may have one projection. Also, if the heating device 23 can be supported, it may be a projecting portion other than the projection.

In the above embodiments, the bracket 21 and the lens hood 22 are formed separately. Instead of this structure, the bracket 21 and the lens hood 22 may be formed integrally. In other words, the bracket 21 may have a support portion same as that of the lens hood 22. The support portion in this embodiment may support the heating device 23, may be provided with one or a plurality of non-contact portions, and is not limited to the shapes described in the above embodiments. Also, in this embodiment, the heating device 23 and the reflection suppressing sheet 24 may be provided attachably and detachably to the bracket 21.

The present invention is not limited to the above embodiments, and it is possible to appropriately change the design within the features of the invention. For example, the lens hood 22 is not a trapezoidal shape in a plane view, and may be a rectangular shape. Also, the bracket 21 may have a shape where the light shielding wall 21W is omitted, and may have a structure having one engagement leg. If the engagement leg is not required, the engagement leg may be omitted.

In the above embodiments, the imaging apparatus 10 is mounted on the vehicle to take an image around the vehicle. Instead of this, the imaging apparatus 10 may be an imaging apparatus mounted on a moving structure other than a ship, an airplane, a vehicle and so on, or on a fixed place. For example, the imaging apparatus 10 mounted on the moving structure may be provided around a window glass of the moving structure to take an image of an outer environment of the moving structure. Also, the imaging apparatus provided on the fixed position is mounted around a window glass of a structure to take an image of an outer environment of the structure and so on.

What is claimed is:

1. A supporting apparatus for an imaging device having a lens, for supporting the imaging device, comprising:
   a bracket supporting the imaging device and including
      a notch housing therein the lens of the imaging device and exposing the lens, and
      a light shielding wall on both sides of the notch for shielding an incident light,
   a unit detachably attached to the bracket and located between the light shielding wall and a heating subject and exposing a front face of the unit toward the heating subject,
   wherein the unit comprising:
      a heating device having a heat generating portion, and
      a supporting portion for supporting the heating device from a rear surface, the supporting portion including a first surface facing (a) the lens of the imaging device and (b) the heating subject and a second surface on the other side of the first surface, and
      a reflection suppressing sheet on the rear surface of the heating device,
   wherein the heating device is provided on the first surface of the supporting portion,
   the first surface of the supporting portion includes one or a plurality of non-contact portions which do not contact the heat generating portion, and
   the light shielding wall of the bracket is configured to reflect radiant heat from the heating device.

2. A supporting apparatus for an imaging device according to claim 1, wherein the supporting portion includes a projection contacting the heat generating portion.

3. A supporting apparatus for an imaging device according to claim 2, wherein the supporting portion includes a plurality of the projections with a predetermined height.

4. A supporting apparatus for an imaging device according to claim 1, wherein the supporting portion includes a pair of edge portions contacting the heat generating portion, and one non-contact portion between the pair of edge portions.

5. The supporting apparatus according to claim 1, wherein a heat transfer rate of air in the non-contact portion is lower than that of the supporting portion.

6. The supporting apparatus according to claim 1, wherein the reflection suppressing sheet is on the heat generating portion of the heating device on a side facing the heating subject.

7. The supporting apparatus according to claim 1, wherein the supporting portion, the heating device and the reflection suppressing sheet constitute the unit detachably attached to the bracket.

8. The supporting apparatus according to claim 1, wherein the heating device includes a heat generating portion including a heater, a driving portion electrically connected to the heat generating portion and a protection circuit configured to suppress a magnitude of the current flowing through the heater within a predetermined range.

9. The supporting apparatus according to claim 1, wherein the one of the plurality of non-contact portions include space which is defined by a recess on the supporting portion and one or more ridges projecting from a bottom of the recess and contacting the heating device.

10. An imaging apparatus comprising an imaging device having a lens, and a supporting apparatus for the imaging device for supporting the imaging device,
wherein the supporting apparatus for the imaging device includes:
a bracket supporting the imaging device and including
a notch housing therein the lens of the imaging device and exposing the lens, and
a light shielding wall on both sides of the notch for shielding an incident light,
a unit detachably attached to the bracket and located between the light shielding wall and a heating subject and exposing a front face of the unit toward the heating subject,
wherein the unit comprising:
a heating device having a heat generating portion, and
a supporting portion for supporting the heating device from a rear surface, the supporting portion including a first surface facing (a) the lens of the imaging device and (b) heating subject and a second surface on the other side of the first surface,
wherein the heating device is provided on the first surface of the supporting portion,
the first surface of the supporting portion includes one or a plurality of non-contact portions which do not contact the heat generating portion, and
the light shielding wall of the bracket is configured to reflect radiant heat from the heating device.

11. The imaging apparatus according to claim 10, wherein a heat transfer rate of air in the non-contact portion is lower than that of the supporting portion.

12. The imaging apparatus according to claim 10, wherein the reflection suppressing sheet is on the heat generating portion of the heating device on a side facing the heating subject.

13. The imaging apparatus according to claim 10, wherein the supporting portion, the heating device and the reflection suppressing sheet constitute the unit detachably attached to the bracket.

14. The imaging apparatus according to claim 10, wherein the heating device includes a heat generating portion including a heater, a driving portion electrically connected to the heat generating portion and a protection circuit configured to suppress a magnitude of the current flowing through the heater within a predetermined range.

15. The imaging apparatus according to claim 10, wherein the one of the plurality of non-contact portions include space which is defined by a recess on the supporting portion and one or more ridges projecting from a bottom of the recess and contacting the heating device.

* * * * *